Figure 1:
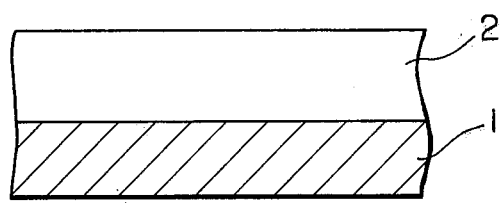

United States Patent [19]

Seino et al.

[11] 4,259,398
[45] Mar. 31, 1981

[54] ELECTRICAL INSULATING MATERIAL

[75] Inventors: Shunji Seino; Ryota Nishiyama; Masaoki Nozaki, all of Tokyo, Japan

[73] Assignee: Mitsubishi Paper Mills, Ltd., Tokyo, Japan

[21] Appl. No.: 60,632

[22] Filed: Jul. 23, 1979

[51] Int. Cl.³ .............................................. B32B 5/16
[52] U.S. Cl. .................................. 428/283; 156/62.8; 156/307.1; 156/308.2; 162/125; 162/129; 162/138; 162/145; 162/146; 162/181 C; 162/181 R; 428/284; 428/287; 428/297; 428/298; 428/302; 428/324; 428/402
[58] Field of Search ............... 162/145, 146, 138, 125, 162/181 C, 129, 181 R; 428/245, 247, 255, 284, 286, 297, 248, 302, 324, 402, 296, 283; 156/306, 62.8, 307.1, 308.2

[56] References Cited

U.S. PATENT DOCUMENTS

| 2,948,329 | 8/1960 | Gaines | 162/138 |
| 3,168,434 | 2/1965 | Heyman | 162/138 |
| 3,215,590 | 11/1965 | Purvis | 162/138 |
| 3,523,061 | 8/1970 | Purvis | 162/138 |
| 4,060,451 | 11/1977 | Ucheyama et al. | 162/146 |

Primary Examiner—James J. Bell
Attorney, Agent, or Firm—Cushman, Darby & Cushman

[57] ABSTRACT

An electrical insulating material composed of a mica flake layer and a heat resistant base material layer is prepared by superposing the mica flake sheet containing at most 9% by weight of pulp-like particles of a heat resistant polymer based thereon on the heat resistant base material sheet, both of which sheets being dried, and heating them under pressure. The electrical insulating material has excellent in structural strength, varnish-impregnability, and is resist to pealing off of the mica flakes.

8 Claims, 2 Drawing Figures

ELECTRICAL INSULATING MATERIAL

This invention relates to an electrical insulating material. More particularly, it relates to an electrical insulating material which comprises a layer of tiny mica flakes and layer(s) of heat resistant base material integrally provided on the first layer.

Recently, pulp-like particles obtainable by mixing a solution of heat resistant synthetic polymer with its non-solvent are watched with interest as elementary material for electrical insulating papers because of their excellent heat resistance, insulating property, etc.

As concrete prior technique therefor, there are, for example, Japanese Patent Publication No. 11851/60 and Japanese Patent Publication No. 20421/68 disclosing the technique. The former publication deals with a pulp-like particles, while the latter deals with a high temperature resistant sheet-like structure suitable for use as an electrical insulating paper, which comprises an entangled mixture of mica and substantially unmolten pulp particles of aromatic polyamide.

However, when these products are used as an electrical insulating material, they are still unsatisfactory in respect of over-all purpose characteristics including insulating property, varnish-impregnability and mica retention.

That is, in the structure of Japanese Patent Publication No. 20421/68, a mixture is made of mica and pulp-like particles of aromatic polyamide. Such structure, however, is undesirable in that if the proportion of mica is high in the formulation the mica is readily separable upon abrasion, the strength of structure markedly decreases and the workability is quite low, if the proportion of pulp-like particles of aromatic polyamide is high the varnish-impregnability is deteriorated and therefore the insulating property becomes unsatisfactory, and if the formulation ratio is in the medium range any of the characteristic properties are unsatisfactory.

On the other hand, a reinforced mica paper which is made by bonding a mica layer to an insulating base material with adhesive has the following problems. That is, in addition to the above-mentioned difficulties, it invites the occurrence of corona discharge due to the voids in the varnish layer used for bonding mica paper to an insulating base material in order to reinforce the strength, which is undesirable from the practical point of view.

On the above-mentioned background, the present inventors conducted earnest studies to find out that the requirements concerning not only structural strength, varnish-impregnability and insulating property but also corona resistance can be fulfilled simultaneously by mixing mica and pulp-like particles of a heat resistant polymer in a specified proportion, making the mixture into a sheet, superposing the sheet(s) on one side or both sides of a heat resistant base material and then integrating them by the action of heat and pressure.

This invention offers an electrical insulating material comprising a heat resistant base material layer having a practically sufficient strength and a layer of a mixture of at least 91 parts by weight of tiny mica flakes and at most 9 parts by weight of pulp-like particles of a heat resistant polymer, which is integrated at least one side of the heat resistant base material layer, the integration being effected under pressure by heating without use of any adhesives.

The drawings attached illustrate embodiments of this invention, wherein

Figure 2:
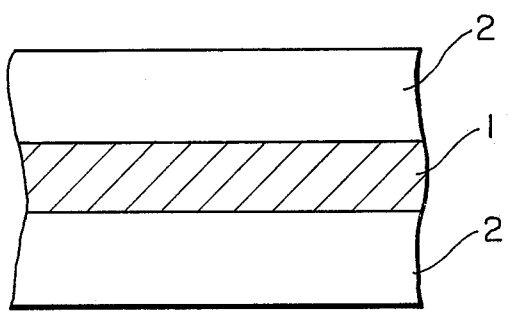

FIG. 1 is sectional view of an electrical insulating material having a layer containing tiny mica flakes (2) bonded to one side of heat resistant base material layer (1) and FIG. 2 is sectional view of an electrical insulating material having layers containing tiny mica flakes (2) bonded to both sides of heat resistant base material layer (1).

The critical ratio of the pulp-like particles of heat resistant polymer to the mica in the layer (2) is difficult to determine as a fixed value within the range, because it is dependent on the kind and properties of the polymer selected and its combination. Though any ratio within the range may be employed so far as it enables the bonding of layer (2) to the heat resistant base material layer (1), the quantity of the pulp-like particles of heat resistant polymer is usually in the range of 3–9% by weight and preferably 5–9% by weight based on the mica. Such a value can be determined so as to fall in the range in which excellent electrical insulating characteristics are exhibited, the bonding to the heat resistant base material layer is good and the separation of mica can be suppressed. As above, this invention necessitates no adhesive for the integration of the layer containing tiny mica flakes (2) and heat resistant base material (1) and, as its result, it is saved from the deterioration of electrical properties due to the void formation at the time of treatment with adhesive and, at the same time, impregnability, insulating property, heat resistance and structural strength can be satisfied simultaneously. Though such a structure is represented by the embodiments shown in FIG. 1 and FIG. 2, they may also be made into a laminated structure having two or more structural units, if necessary.

It may be produced by superposing a dried mica paper on a dried heat resistant base material layer and passing it through usual heat calender or treating it with the so-called hot press which comprises putting it between hot plates and pressing it. The temperature of heating should be near the softening temperature of the heat resistant polymer. Accordingly, this invention is practised in the temperature range of 150°–330° C., though the optimum temperature may vary depending on the kind of polymer used.

The extent of pressing is preferably 50–300 kg/cm in the case of heat calender and 50–150 kg/cm² in the case of hot press.

Although the heat resistant polymer and the heat resistant base material used in this invention may be of any type ultimately so far as they have a practical strength and an electrical insulating character, they should soften upon heating. In general, the layer (2) containing granular mica and a heat resistant polymer is obtained by mixing tiny mica flakes with pulp-like particles of said polymer and wet paper-making therefrom. On the other hand, the heat resistant base material layer (1) is produced by paper-making a sheet from the pulp-like particle alone, of said polymer, or its mixture with a fiber of said polymer and/or an inorganic fiber, though non-woven cloth, woven cloth, mesh-like sheet of said polymer fiber or a synthetic film or the like may also be used.

As above, according to this invention, a layer (2) of a mixture of mica flakes and pulp-like particles of the heat resistant polymer is integrally provided on one side or both sides of heat resistant base material layer (1) by the action of heat and pressure. When it is necessary that the heat resistant base material layer (1) still retains a varnish-impregnability even after the integration. The fiber component therein is preferably much in the proportion of fiber and pulp-like particles. Further inorganic fibers, for example, glass fiber is preferably used with pulp-like particle nonwoven cloth, woven cloth and mesh-like sheet are preferably used and further the fiber component therein is preferably much in the proportion of fiber and pulp-like particle.

As the heat resistant polymer used in the heat resistant base material layer (1), for example, aromatic polyamides, polyamide-imides and polyimides can be mentioned. Examples of said inorganic fiber include glass fibers, ceramic fibers, asbestos, rock wool and the like.

Examples of the flake mica usable in the mica layer (2) include muscovite and phlogopite, and the like. They may be put to use after a direct pulverization or after calcination and a subsequent pulverization.

As the heat resistant polymer used in the mica layer (2), the same polymers and pulp-like particles as employed in the above-mentioned layer (1) can be referred to.

As above, this invention is characterized by bonding (1) and (2) together without using any adhesives. Therefore, this invention has a great value from the viewpoint of industrial application.

This invention will be illustrated in more detail with reference to the following examples, in which "part" is by weight.

In the examples, properties of the products were evaluated by the following methods:

(1) Varnish-impregnability: A test piece having a width of 2 cm was vertically suspended above an epoxy varnish (viscosity: about 3 poises at 20° C.) so that one end of the test piece may touch the varnish. After 24 hours, the height to which the varnish had reached was measured.

(2) Mica detouch: The surface of mica layer was rubbed several times with the fingers and the detached mica granules were estimated.

(3) Interlayer adhesion: A test piece having a width of 2 cm was repeatedly distorted in S-form 5 times and interlayer separation was observed.

EXAMPLE 1

10 Parts of poly-m-phenyleneisophthalamide having a logarithmic viscosity of 1.5 in sulfuric acid was dissolved into 90 parts of N,N-dimethylacetamide containing 5 parts of lithium chloride. The solution was introduced into an aqueous solution of glycerin placed in a "homomixer" working at a high speed to obtain pulp-like particles.

This pulp-like product had a freeness of 85 cc in terms of Canadian standard freeness.

On the other hand, poly-m-phenyleneisophthalamide was wet-spun, stretched 2.5 times in boiling water and heat-treated to obtain a 2-denier fiber. It was cut into 6 mm to obtain a short fiber.

(i) Preparation of mica paper 95 parts of partially dehydrated muscovite tiny flaked mica and 5 parts of the above-mentioned pulp-like particles of heat resistant polymer were dispersed into water, from which was made a dry mica paper having a basis weight of 130 g/m$^2$. This was designated as "mica paper A".

(ii) Preparation of base material

A mixture consisting of:

| | |
|---|---|
| Above-mentioned pulp-like particle of heat resistant polymer | 60 parts |
| Short fiber of heat resistant polymer | 20 parts |
| Glass fiber (diameter 5 μ, 6 mm cut fiber; chopped strand C806D-630B supplied by Asahi Fiber Glass Co.) | 20 parts | was dispersed into water. A base sheet was prepared therefrom and dried by the same procedure as in (i). Its basis weight was adjusted to 60 g/m$^2$. This was designated as "base sheet a".

Another sheet was prepared from a mixed dispersion of 80 parts of the same pulp-like particle and 20 parts of the same short fiber as above. Its basis weight was 30 g/m$^2$. This was designated as "base sheet b".

(iii) Integration

An electrical insulating sheet of this invention was prepared by superposing the base sheet obtained in (ii) on the mica sheet obtained in (i) and integrating them under a pressure by means of heat calender. The conditions of heat calendering were as follows: roll temperature 290° C., linear pressure: 200 kg/cm. Characteristic properties of the sheet obtained are shown in Table 1.

TABLE 1

| | | No. 1 | No. 2 |
|---|---|---|---|
| Construction | Mica layer | A | A |
| of composite | Base material layer | a | b |
| Basis weight (g/m$^2$) | | 190.9 | 158.3 |
| Thickness (μ) | | 128 | 102 |
| Density (g/cm$^3$) | | 1.49 | 1.55 |
| Tensile strength (kg/20 mm width) | | 5.8 | 4.1 |
| Elongation at rupture (%) | | 2.6 | 5.1 |
| Varnish-impregnability (mm/24 hours) | | 34 | 35 |
| Mica retention | | Good | Good |
| Interlayer adhesion | | Good | Good |
| Dielectric strength (kV/mm) | | 25.7 | 23.6 |

EXAMPLE 2

Trimellitic anhydride and 4,4'-diaminodiphenylmethane were reacted at a molar ratio of 2:1 and then dehydrated. To the reaction mixture were added trimellitic anhydride and 4,4'-diphenylmethane diisocyanate to give a polyamide-imide having a logarithmic viscosity of 0.5 in N-methyl-2-pyrrolidone. Its 10 parts was dissolved into 90 parts of N-methyl-2-pyrrolidone and introduced into an aqueous solution of glycerin placed in a "homomixer" working at a high speed to give a pulp-like particle.

On the other hand, the polyamide-imide was wet-spun, stretched three times in hot water and heat-treated to give a 4-denier fiber. It was cut into 8 mm to give a short fiber.

(1) Preparation of base material layer

By means of a cylinder paper-making machine, a dried base material sheet having a basis weight of 60 g/m$^2$ was prepared from an aqueous dispersion comprising 60 parts of the above-mentioned pulp-like particle and 40 parts of the short fiber.

(ii) Preparation of mica paper

A dried mica paper having a basis weight of 45 g/m$^2$ was prepared by Fourdrinier paper machine from an aqueous dispersion comprising 95 parts of phlogopite tiny flake mica and 5 parts of the above-mentioned pulp-like particle.

(iii) Integration

An electrical insulating sheet was prepared by superposing the base material sheet obtained in (i) on the mica sheet obtained in (ii) and integrating them under a pressure by means of heat calender. Conditions of the heat calendering were as follows: roll temperature: 260° C., linear pressure: 150 kg/cm.

Table 2 illustrates the characteristic properties of the electrical insulating sheet obtained in Example 2.

TABLE 2

| | |
|---|---|
| Basis weight (g/m$^2$) | 106.3 |
| Thickness ($\mu$) | 88 |
| Density (g/cm$^3$) | 1.21 |
| Tensile strength (kg/20 mm width) | 7.5 |
| Elongation at rupture (%) | 8.6 |
| Varnish-impregnability (mm/24 hours) | 25 |
| Mica retention | Good |
| Interlayer adhesion | Good |
| Dielectric strength (kV/mm) | 19.6 |

What is claimed is:

1. A process for producing an electrical insulating material comprising superposing a dried sheet of a mixture of at least 91 parts by weight of tiny mica flakes and at most 9 parts by weight of pulp-like particles of a heat resistant polymer selected from the group consisting of an aromatic polyamide and an aromatic polyamide-imide on at least one side of a dried sheet of a heat resistant base material containing the heat resistant polymer, which has sufficient structural strength and bonding them by heating at a temperature of 150° to 330° C. under a linear pressure of 50 to 300 kg/cm.

2. An electrical insulating material produced by the process according to claim 1.

3. A process according to claim 1, wherein the heat resistant base material contains pulp-like particles of the heat resistant polymer or a mixture of the pulp-like particles with short fibers of the heat resistant polymer.

4. A process according to claim 3, wherein the heat resistant base material contains further inorganic fibers.

5. A process according to claim 1, wherein the temperature of said heating is near the softening temperature of said heat resistant polymer.

6. An electrical insulating material produced by the process according to claim 3.

7. An electrical insulating material produced by the process according to claim 4.

8. An electrical insulating material produced by the process according to claim 5.

* * * * *